(12) United States Patent
Battlogg et al.

(10) Patent No.: US 7,922,202 B2
(45) Date of Patent: Apr. 12, 2011

(54) ENERGY ABSORBING DEVICE (75) Inventors: Stefan Battlogg, St. Anton I.M. (AT); Gernot Elsensohn, St. Anton I.M. (AT); Helmut Kirmsze, Schaan (LI); Jürgen Pösel, Bludenz (AT)

(73) Assignee: Thyssenkrupp Presta AG, Eschen (LI)

( * ) Notice: Subject to any disclaimer, the term of this patent is extended or adjusted under 35 U.S.C. 154(b) by 0 days.

(21) Appl. No.: 12/545,886

(22) Filed: Aug. 24, 2009

(65) Prior Publication Data
US 2010/0045010 A1 Feb. 25, 2010

(30) Foreign Application Priority Data
Aug. 22, 2008 (EP) .................................... 08014896

(51) Int. Cl.
B62D 1/16 (2006.01)
F16F 9/53 (2006.01)

(52) U.S. Cl. ...... 280/777; 74/492; 188/267.1; 188/267.2

(58) Field of Classification Search ..................... 74/492; 280/775, 777; 188/267, 267.1, 267.2, 268, 188/269
See application file for complete search history.

(56) References Cited

U.S. PATENT DOCUMENTS

| | | | | |
|---|---|---|---|---|
| 3,405,728 A * | 10/1968 | Dexter ......................... 137/251.1 |
| 3,552,275 A * | 1/1971 | Chaney et al. .................. 91/418 |
| 5,170,866 A * | 12/1992 | Ghaem ....................... 188/267.1 |
| 5,632,361 A | 5/1997 | Wulff et al. |
| 6,279,952 B1 * | 8/2001 | Van Wynsberghe et al. . 280/777 |
| 6,296,280 B1 * | 10/2001 | Struble et al. ................. 280/777 |
| 6,471,018 B1 * | 10/2002 | Gordaninejad et al. ... 188/267.1 |
| 7,165,786 B1 * | 1/2007 | Sha et al. ....................... 280/775 |
| 7,380,827 B2 * | 6/2008 | Bannon ......................... 280/777 |
| 7,731,235 B2 * | 6/2010 | Klukowski .................... 280/777 |
| 2001/0048362 A1 * | 12/2001 | Spencer ...................... 340/425.5 |
| 2008/0245627 A1 | 10/2008 | Battlogg et al. |
| 2008/0245628 A1 | 10/2008 | Battlogg et al. |
| 2008/0245629 A1 | 10/2008 | Battlogg et al. |
| 2010/0045011 A1 * | 2/2010 | Battlogg et al. .............. 280/742 |

FOREIGN PATENT DOCUMENTS

| | | |
|---|---|---|
| DE | 4433056 A1 | 3/1996 |
| JP | 4-88233 A * | 3/1992 |
| WO | 0037298 A1 | 6/2000 |
| WO | 2007068016 A1 | 6/2007 |
| WO | 2007068435 A1 | 6/2007 |
| WO | 2007068436 A1 | 6/2007 |
| WO | WO 2007124831 A1 * | 11/2007 |

OTHER PUBLICATIONS

European Search Report dated Feb. 17, 2009.

* cited by examiner

*Primary Examiner* — Paul N Dickson
*Assistant Examiner* — Joseph Rocca
(74) *Attorney, Agent, or Firm* — Laurence A. Green; Werner H. Stemer; Ralph E. Locher (57) ABSTRACT

An energy-absorbing apparatus for occupant protection in vehicles has a receptacle in which a magnetorheological fluid is present, which in the event of an impact is pressed through a flow zone. The apparatus further has a device generating a variable magnetic field and which has a core which is wound with a coil. The magnetic field acts on the magnetorheological fluid in order to regulate the flow properties. The coil together with the core is arranged in the flow zone. The axis of the coil lies perpendicularly to the direction of flow of the magnetorheological fluid, and the flow zone has a sheathing formed of a magnetically conductive material.

23 Claims, 6 Drawing Sheets

ENERGY ABSORBING DEVICE

CROSS-REFERENCE TO RELATED APPLICATION

This application claims the priority, under 35 U.S.C. §119, of European application EP 08 014 896.8, filed Aug. 22, 2008; the prior application is herewith incorporated by reference in its entirety.

BACKGROUND OF THE INVENTION

Field of the Invention

The invention relates to an energy-absorbing apparatus for occupant protection in vehicles. The apparatus has a receptacle containing a magnetorheological fluid which is pressed through a flow zone in the event of an impact. The apparatus further has a device which generates a variable magnetic field and which has pole faces which are assigned to the flow zone and via which the magnetic field acts on the magnetorheological fluid in order to regulate the flow properties.

So that the flowability of the magnetorheological fluid can be influenced by a magnetic field such that the flow resistance of the flow zone changes, various criteria have to be fulfilled. A magnetic field generated by a coil has to be introduced into the magnetorheological fluid, for which purpose elements and parts of the apparatus which are provided for the direct path of the flux lines through the magnetorheological fluid should have better magnetic conductivity than other elements and parts which are outside the direct path of the flux lines.

An apparatus of this type is described, for example, in international patent disclosure WO 2007/068436, corresponding to U.S. patent publication Nos. 20080245628 A1 and 20080245629 A1. The magnetic field is generated by a coil which is provided with a C-shaped core formed of a magnetically active material, in particular an iron core. Between the two slightly spaced-apart pole faces of the C-shaped core, an outlet duct of rectangular cross section is led through out of the receptacle and contains the flow zone. The walls of the outlet duct which bear against the pole faces are formed of a magnetically highly conductive material, whereas the side walls are formed of a material having a least lower magnetic conductivity than the magnetorheological fluid.

The special circumstances occurring in the event of an impact leave only an extremely short time span within which the flowability of the magnetorheological fluid must be varied. In order to change the flowability, a minimum dwell time in a magnetic field is required, and therefore the cross section of the outlet duct and its magnetizing length, that is to say the length of the pole faces, predetermine that volume of the magnetorheological fluid which can be magnetized in a minimum dwell time. So that the volume flow resulting from the pressure area acting on the fluid in the receptacle and from the velocity of travel of the pressure area upon impact is equated to the volume flow determined by the minimum dwell time, specific dimensions of the outlet duct are required. Since the outlet duct height determined by the spacing between the pole faces should only be increased to a limited extent, mostly only the width of the outlet duct and the length within which the magnetic field acts can therefore be changed, insofar as construction space problems do not also limit these.

According to international patent disclosure WO 2007/068436, an attempt is made to increase the dwell time of the fluid between the pole faces by fittings introduced into the flow zone, when the length of the flow zone within which the magnetic field acts is too short, for example by a separating plate having a plurality of webs which are upstanding on both sides and are arranged in offset rows. The passage of fluid is thereby extended, but the cross-sectional area of the outlet duct and therefore the volume magnetizable per unit time are reduced by the webs.

SUMMARY OF THE INVENTION

It is accordingly an object of the invention to provide an energy absorbing device which overcomes the above-mentioned disadvantages of the prior art devices of this general type. The set object of the invention, then, is, even under extremely restricted conditions of space, to introduce magnetic forces causing the change in viscosity of the magnetorheological fluid, and achieves this in that the coil together with the core is arranged in the flow zone. The axis of the coil lies perpendicularly to the direction of flow of the magnetorheological fluid, and the flow zone has a sheathing formed of a magnetically conductive material. The magnetically highly conductive material is, in particular, a material, such as is used for coil cores in practice and is designated further as coil core material.

With the foregoing and other objects in view there is provided, in accordance with the invention, an energy-absorbing apparatus for occupant protection in vehicles. The energy-absorbing apparatus contains a flow zone having a sheathing formed of a magnetically conductive material, a receptacle containing a magnetorheological fluid being pressed through the flow zone in an event of an impact, and a device for generating a variable magnetic field and has a core wound by a coil. The variable magnetic field acts on the magnetorheological fluid for regulating flow properties. The coil together with the core are disposed in the flow zone. The coil has an axis lying perpendicularly to a direction of flow of the magnetorheological fluid.

Since coils, together with a core, are dispensed with on the outside, and the sheathing of the flow zone, which is generally a tube or the like, is used as part of the coil core, a specially space-saving configuration is thus achieved.

In a preferred first embodiment, which also substantially improves the magnetization of the magnetorheological fluid, it is provided that the flow zone is subdivided into two flow routes by the core wound around with the coil. In particular, each of the two flow routes is here also subdivided by at least one further partition having pole faces.

Each subdivision or partition, although reducing the cross-sectional area of the flow zone and consequently the fluid volume magnetizable per unit time, nevertheless brings about substantially better magnetization due to the smaller spacings between two pole faces in each case. This makes it possible to increase the overall height of the flow zone such that its throughflow cross section, in spite of the partition, can be kept correspondingly large to the magnetizable volume of the magnetorheological fluid being pressed through.

Preferably, a plurality of partitions are combined into a bundle and are inserted into the flow zone. In this bundle, the spacings, critical for the intensity of magnetization, between the pole faces are very small.

The coil lying on the inside and the partitions reduce the free average cross section, with the result that the entrance to the flow zone constitutes a contraction, the flow zone preferably being provided in an outlet duct of the receptacle. The additional pole faces increase the concentration of the magnetic field onto the particles in the magnetorheological fluid which come into interaction with the magnetic field. In this case, to improve the action, turbulences in the flow should as far as possible be avoided, at least not promoted. The installation of partitions which have a smooth surface not promoting any turbulences is therefore to be preferred. In particular, planar faces are suitable. Upstanding webs and edges are a disadvantage. In contrast to this, friction-increasing layers are perfectly conceivable and possible.

In a first embodiment, the bundle may be constructed from partitions which extend parallel to the flow routes and which are spaced apart by upstanding spacer pieces or tabs, in particular bent-up edge tabs. The bundle can be held together via any desired connection to the tabs, direct adhesive bonding, soldering, adhesive strips or the like. For example, 16 partitions of a thickness of 0.2 mm may be provided which subdivide the outlet duct into 17 flow routes of 0.2 mm. The outlet duct therefore has a clear height of 6.6 mm in the region of the pole faces. In another version of the invention, the bundle of partitions may also be produced by a zigzag-like folding of a material sheet. The partitions extending parallel to the flow routes may, for example, be manufactured from coil core material and be spaced apart from one another by spacer pieces or webs consisting of a material having lower magnetic conductivity than the magnetorheological fluid.

At least some of the partitions, but preferably all the partitions, are of a planar configuration, without projections, and are oriented perpendicularly to the flux lines of the magnetic field which are bunched between the pole faces.

In a further preferred version, the partitions lie lined up closely to one another perpendicular to the flow direction in the flow zone and have aligned slots which form the flow routes. In this case, the slot walls constitute the additional pole faces. A partition of this type may be produced as a sheet metal stamping, as a sintered part or as an MIM part (by metal injection molding), the partition having, for example, a ladder-like or a comb-like appearance. Preferably, the remaining webs between the slots may also extend on both sides of a middle connecting web.

A version in which the partitions are stamped out of transformer sheet and are insulated, in particular lacquered, at least on the faces touching one another can be produced particularly advantageously and easily. The insulation prevents the situation where eddy currents which occur may be added together.

In a further preferred version, the partitions are combined in two bundles which are arranged on both sides of the core wound with the coil. The core arranged between the two bundles of partitions is preferably designed as an approximately parallelepipedal block, around which is laid the coil winding, the axis of which lies perpendicularly to the direction of flow through the outlet duct. The core within the coil may likewise contain flow routes if the winding of the coil is three-dimensional and leaves free the inlet and outlet orifices of the flow routes.

The invention also makes it possible in a simple way to provide the sheathing with a cylindrical cross section. In this preferred embodiment, the apparatus contains in particular a continuous cylindrical tube in which the contraction, as mentioned, is formed due to the installation of the coil including core and preferably also of the two bundles of partitions. In this version, each bundle is preferably assigned, as a closure, an element having a cross section in the form of a segment of a circle and formed of a material of high magnetic conductivity, for example formed from a transformer sheet or a ferrite powder, so that the cylindrical tube is filled.

If the partitions are stamped out of the coil core material, as described above, the remaining webs cannot be formed of a material of lower magnetic conductivity; it has been shown, however, that, with appropriate minimization, the webs are saturated magnetically such that the magnetic field is still forced sufficiently through the flow routes. Alternatively, clearances in the partitions may advantageously be provided, through which are led holding devices formed of a material of low magnetic conductivity or of magnetically non-conductive material which keep the partitions spaced apart from one another.

In a further preferred version, there may be provision for the bundle to have a cavity which is continuous over the length and which extends centrally in the outlet duct. This version makes it possible to lead a component through the contraction and the inserted bundle. This component may, for example, be a cable or a piston rod or the like if a piston pressing the magnetorheological fluid out of the receptacle in the event of an impact is not pushed, but, instead, is pulled. A pull device of this type is described in more detail in international patent disclosure WO 2007/068435. This version of the invention makes it possible to have a particularly simple and compact configuration, along with very low losses in the action of the magnetic field introduced.

Receptacles outlet duct may also be manufactured in one piece from a continuous tube. If the tube is cylindrical, as is advantageous, particularly at higher pressures, for the absorption of stresses, along with low deformation, the magnetic circuit is then supplemented or completed by elements having a cross section in the form of a segment of a circle, which is formed of a coil core material and the curved faces of which bear against the inside of the tube formed of a material of high magnetic conductivity.

Starting from the core of the coil, approximately in the middle of the flow zone, the flux lines therefore run vertically outwards through the flow route or a bundle of partitions with additional pole faces and an element in the form of a segment of a circle into the cylindrical tube, out of which they return, diametrically opposite, through the second element in the form of a segment of a circle and the second flow route or a second bundle of partitions into the wound-around core arranged in the middle.

In a further preferred version, one or two three-dimensional coils may be provided, which have an approximately semicircular portion in each case between two straight portions extending in the longitudinal direction. If two three-dimensional coils are arranged symmetrically to one another, then in each case an element in the form of a segment of a circle may be provided as a core, a bundle of partitions then preferably being provided between the two elements in the form of a segment of a circle. As already mentioned above, a continuous cavity may advantageously be formed inside the bundle lying between the two coils.

If the partitions are provided perpendicularly to the flow zone and are stamped out of a transformer sheet or another coil core material, then there is preferably provision, further, whereby, in each partition, at least the webs separating the slots and preferably also a middle region belonging to the core, and also the elements in the form of a segment of a circle, are produced in one piece and coherently via at least one connecting web.

Such energy absorption apparatuses according to the invention may be used, for example, in steering columns for absorbing the impact energy which is transmitted to the steering wheel by the driver in the event of an accident. Functionality must be ensured here through a long service life. So that the magnetorheological fluid is exposed as little as possible to variation over the service life, in a preferred version the magnetorheological fluid is sealingly enclosed in a capsule. The capsule preferably has in its wall a predetermined bursting region which, when a predefined internal pressure is overshot, bursts open and causes the magnetorheological fluid to emerge from the capsule. In this case, it is conceivable and possible to enclose only the magnetorheological fluid in the capsule and to insert the capsule into the receptacle such that the bursting region comes to lie at the contraction followed by the outlet duct.

In an alternative embodiment, the entire apparatus or at least the receptacle, filled with the magnetorheological fluid, and the flow zone are surrounded by the capsule. The bursting region is in this case arranged on the side, facing away from the receptacle, of the flow zone which is already filled with fluid from the outset. When the bursting region opens, the fluid emerges from the orifice obtained and flows out through the outlet duct. In this way, the "idle stroke time" until the counterforce is generated by the flow through the flow zone can be shortened. To intercept the fluid, an additional interception capsule may be provided which surrounds the first capsule. Further, the magnetic field or the field-generating component may, if required, be used for heating the fluid.

In a further version of the apparatus according to the invention, the entire device for generating the variable magnetic field (coil, partition bundles, core, etc.) can also be moved axially in a cylindrical tube, for example in order to set the length of the steering column to different drivers. Advantageously, in this case, the device may be pulled or pushed by a piston rod, through the bore of which the power supply cords can be led, or the device may be moved by a cable.

Other features which are considered as characteristic for the invention are set forth in the appended claims.

Although the invention is illustrated and described herein as embodied in an energy absorbing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
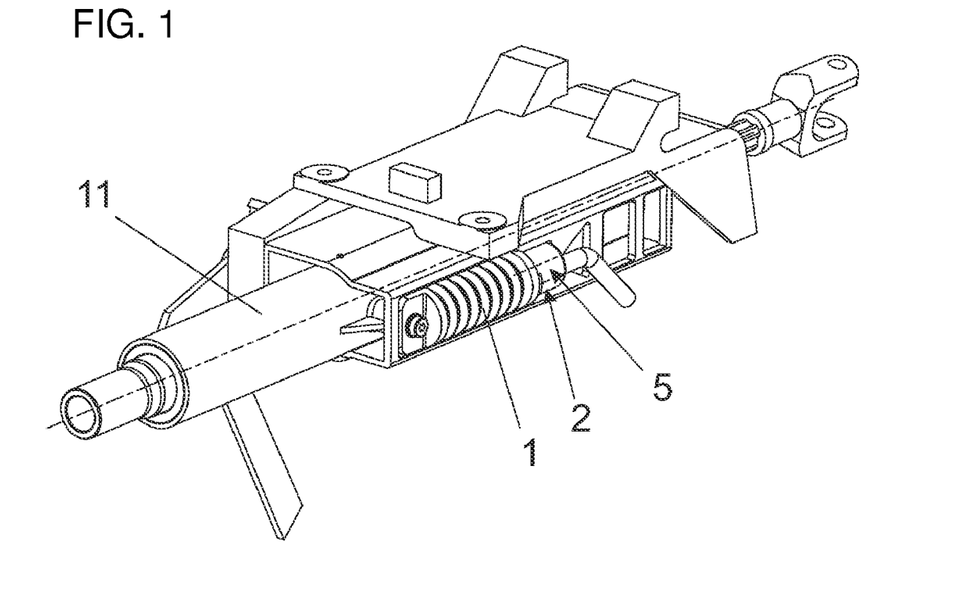
FIG. 1 a diagrammatic, perspective view of a steering column with an apparatus according to the invention.
Figure 8:
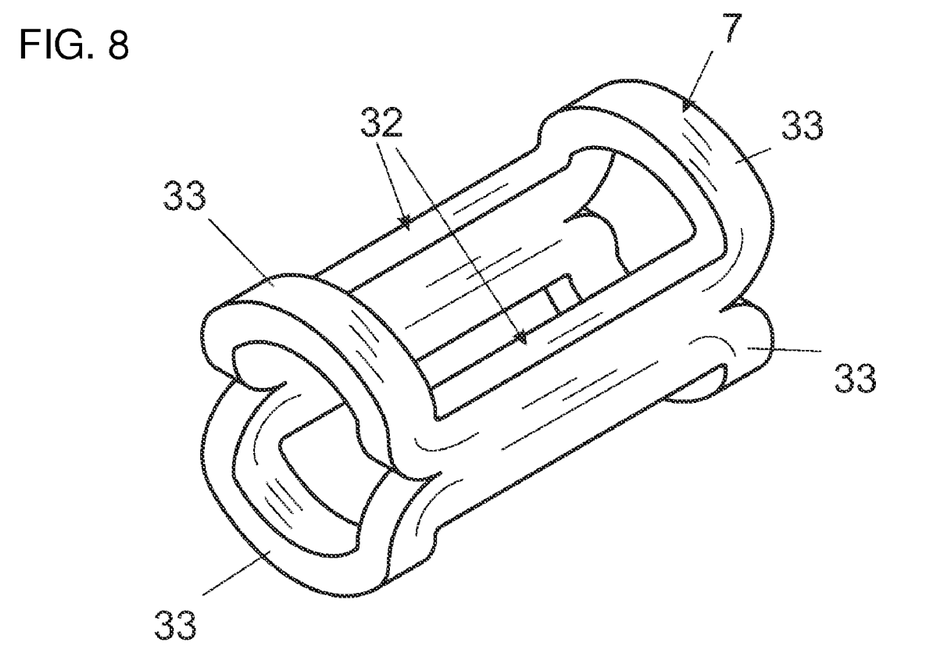
FIG. 8 is a perspective view of a magnet coil of the second embodiment.

Referring now to the figures of the drawing in detail and first, particularly, to FIG. 1 thereof, there is shown an energy-absorbing apparatus that may be provided, for example, on a steering column 11, parallel to the parts of the latter which are displaceable longitudinally in the event of a collision. The apparatus has a receptacle 1, the volume of which can be reduced and which contains a magnetorheological fluid 3 (FIG. 8). The receptacle 1 is fixed at one end of a displaceable part of the steering column 11, while the other end, followed by an outlet duct, stands on or is fixed to a non-displaceable part of the steering column 11. In the event of an impact, the steering column 11 can be shortened, and the magnetorheological fluid contained in the receptacle 1 is pressed into the outlet duct through a flow zone 5 in which the explosion of the magnetorheological fluid is delayed. Impact energy is absorbed by the counterforce thus generated.

A device 2 for generating a variable magnetic field is provided in the region of the contraction for the transmission between the receptacle 1 and the flow zone 5 in the outlet duct. The device 2 contains an electromagnet, via which a magnetic field is generated and influences the flow properties of the magnetorheological fluid. The electromagnet can be activated via signals from sensors, which monitor an impact, as a function of various criteria, such as the weight and sitting position of the driver, etc., the variable magnetic field varying the viscosity of the magnetorheological fluid 3 to be pressed through the orifice, and the counterforce in the system becoming higher or lower, starting from the contraction 4. The receptacle 1 in FIG. 1 has, for example, a compressible concertina.

Figure 2:
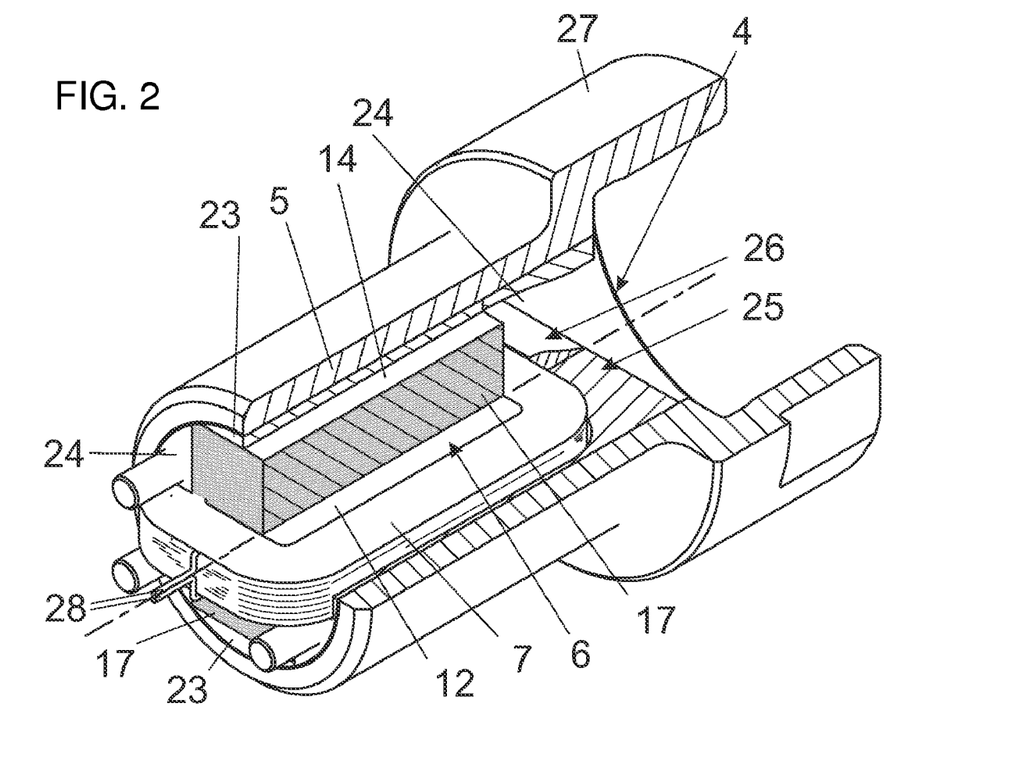
FIG. 2 is a diagrammatic, partially cut-away, perspective view of a first embodiment.
Figure 3:
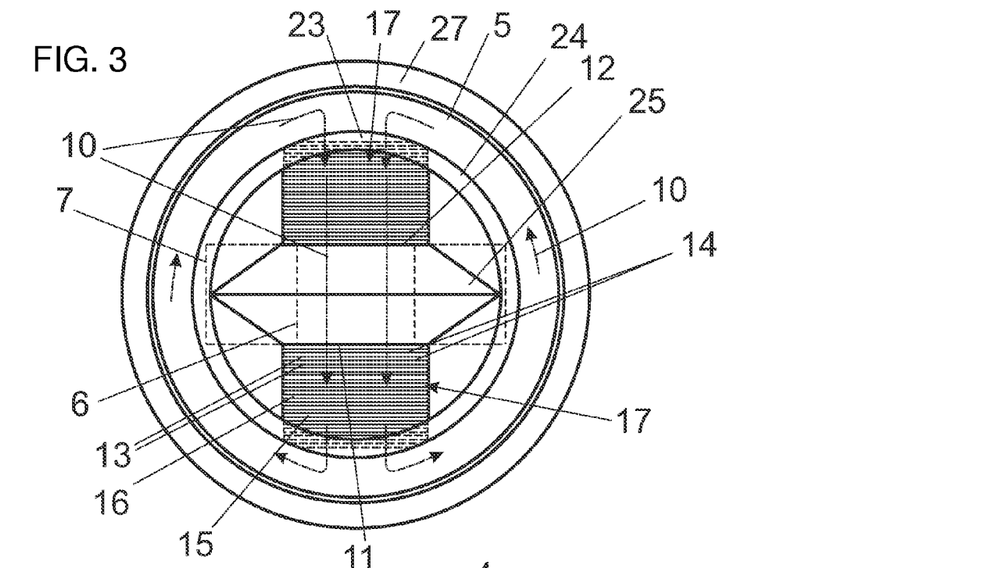
FIG. 3 is a receptacle-side end view of the first embodiment.
Figure 4:
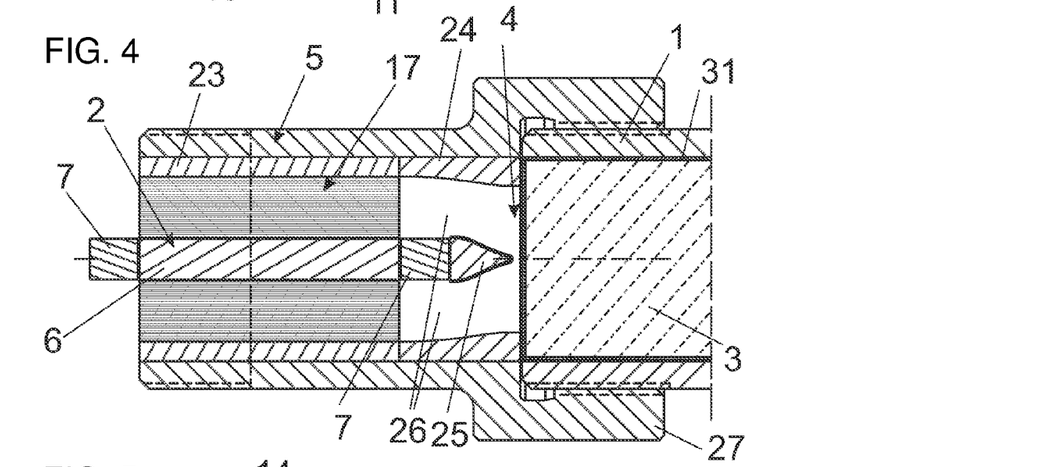
FIG. 4 is a longitudinal sectional view through the first embodiment of the apparatus.

Details of a first embodiment can be seen more clearly in FIGS. 2 to 4. The receptacle 1 is, in particular, cylindrical and contains a displaceable piston, by which the magnetorheological fluid 3 is expelled through the adjacent flow zone 5 in the event of an impact.

A magnet coil arrangement is provided inside the flow zone 5. FIG. 2 shows an angularly sectional oblique view of the outlet duct which is illustrated as a cylindrical tubular piece with a threaded sleeve 27. The receptacle 1 is screwed into the threaded sleeve 27 and is likewise formed by a tubular piece of identical diameter. A contraction 4 at the start of the flow zone 5 is formed by a wedge-shaped middle web 25 of an insert 24, so that the magnetorheological fluid 3 emerging from the receptacle 1 is subdivided into two part streams. The fluid 3 is contained in the receptacle 1 in a thin-walled closed capsule 31, as is shown, for example, in international patent disclosure WO 2007/068016. The capsule 31 is manufactured, for example, from a film which is sealed after the capsule is filled with the fluid. In the event of an impact, the capsule 31 bursts and the fluid 3 passes through the flow zone 5 into the outlet duct. In the capsule 31, a separate bursting region 32 may be provided, in which bursting is facilitated in a special way, for example by a material weakening, so that the outflow of the fluid takes place in a defined way. Advantageously, the material weakening is configured such that, upon bursting, no splinters/shreds are formed which impair the flow. The device 2 being a coil arrangement 2 has a magnet coil 7, the axis of which lies perpendicularly to the flow zone 5 and is arranged centrally in the outlet duct such that it is covered (FIG. 4) by the wedge-shaped middle web 25.

Arranged within the coil 7 is a core 6 which is parallelepipedal in this version and which has planar, mutually parallel pole faces 11, 12.

A permanent magnet or a combination of permanent magnets and soft-magnetic materials may be used as the core. Beyond each part stream 26, in each case an element 23 (pole cap) approximately in the form of a segment of a circle is provided, which is manufactured from coil core material and bears against the inside of the cylindrical outlet duct surrounding the flow zone 5. The outlet duct is likewise produced from a coil core material, for example from an iron tube or the like, in order to close magnetic flux lines 10. Electrical junction lines 28 are led at the outlet-side end out of the outlet duct in a way not illustrated in any more detail. As shown in FIG. 4, this end is likewise provided with an external thread, onto which a collecting pot or the like can be screwed, although this is not absolutely necessary. The magnetic conductivity of the magnetorheological fluid 3 is lower than that of the core 6, of the elements 23 in the form of a segment of a circle and of the outlet duct, so that the action of the magnetic field shown by the flux lines 10 in FIG. 3 is dependent on the height of the gap between the core 6 and the element 23 in the form of a segment of a circle, that is to say on the size of each part stream 26.

Since the magnetization of the magnetorheological fluid 3 is better the smaller the height of the flow zone 5, on both sides of the core 6, each part stream 26 is subdivided by partitions 15, which are formed of a highly conductive coil core material and in particular are combined to form bundles 17, into flow routes 16. Each partition 15 reduces the height and forms additional pole faces 13, 14, the partitions 15 which are formed of coil core material being capable of being spaced apart from one another by webs 22 which are formed of a material having lower magnetorheological conductivity.

In addition to iron as the most beneficial material with good "magnetic" properties, the following also come under consideration as coil core materials:
silicon iron, a relatively beneficial material with good magnetic properties, with low electrical conductivity and with the lowest possible retentivity,
magnetic steel, a material of somewhat higher price, non-corrosive and with somewhat poorer magnetic properties,
nickel iron, a classic soft-magnetic alloy of higher price and with highest permeability, and
iron cobalt as the most costly material, but with the highest saturation flux density.

Depending on the place of use, other materials are possible (for example, a core consisting of ferrite, iron powder or other powder mixtures). Where appropriate, more "exotic" materials afford advantages (for example, BASF Catamold FN50: injection molding-compatible).

Figure 5:
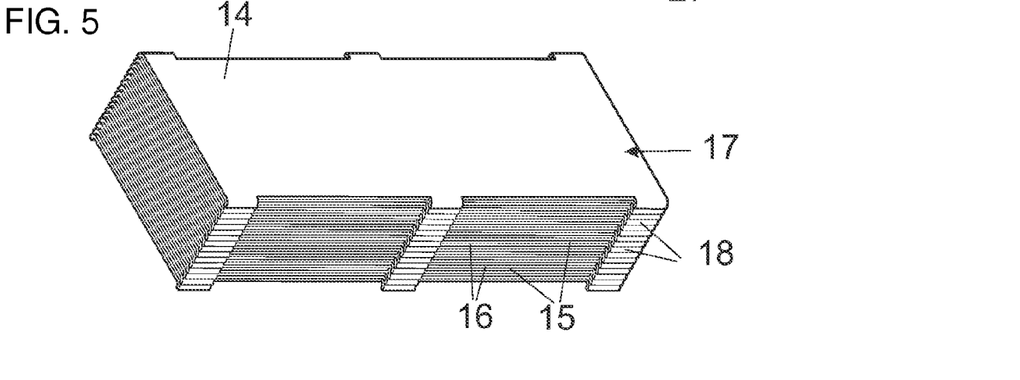
FIG. 5 is a perspective view of a bundle of partitions of the first embodiment.

FIG. 5 shows partitions 15 which have tabs 18 which are bent away along the two longitudinal side margins and by which the partitions 15 are spaced apart and which delimit a multiplicity of flow routes 16. The partitions 15 are connected via the tabs 18 by adhesive bonding, soldering or the like to form a bundle 17 which can be pushed as a unit into the outlet duct. The partitions 15 are formed of, for example, of a transformer sheet, that is to say of a material having very high magnetic conductivity, and the bundle 17 shown in FIG. 4 contains in each case sixteen partitions 15 and flow routes 16 which all have the same thickness or height of, for example, 0.2 mm. The bundle 17 therefore has an overall thickness of 6.4 mm.

The bundle 17 has a central cavity 21, through which can be led, for example, a piston rod or a cable which pulls on the pressure surface, for example a piston, pressing the magnetorheological fluid 3 out of the receptacle 1, as is shown in international patent disclosure WO 2007/068435 previously mentioned.

Figure 6:
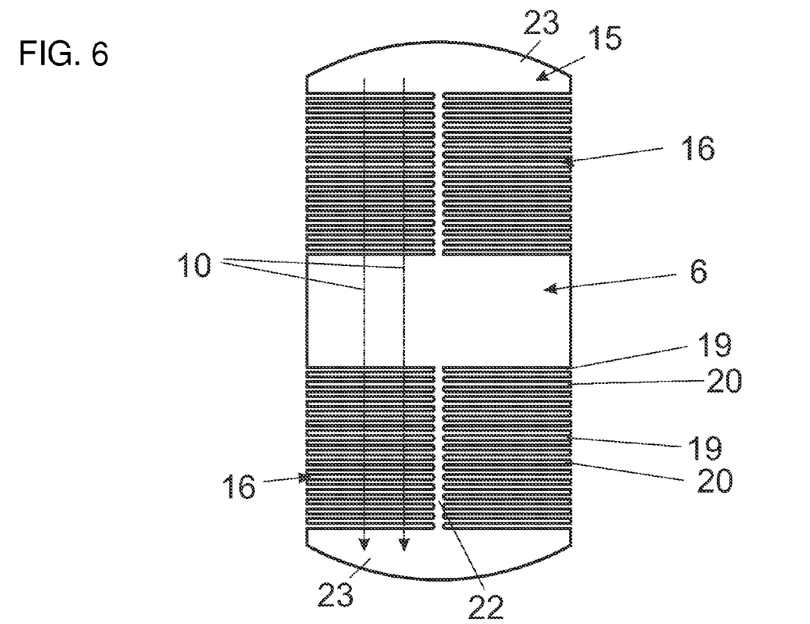
FIG. 6 is a diagrammatic, illustration of a second embodiment of a partition.
Figure 7:
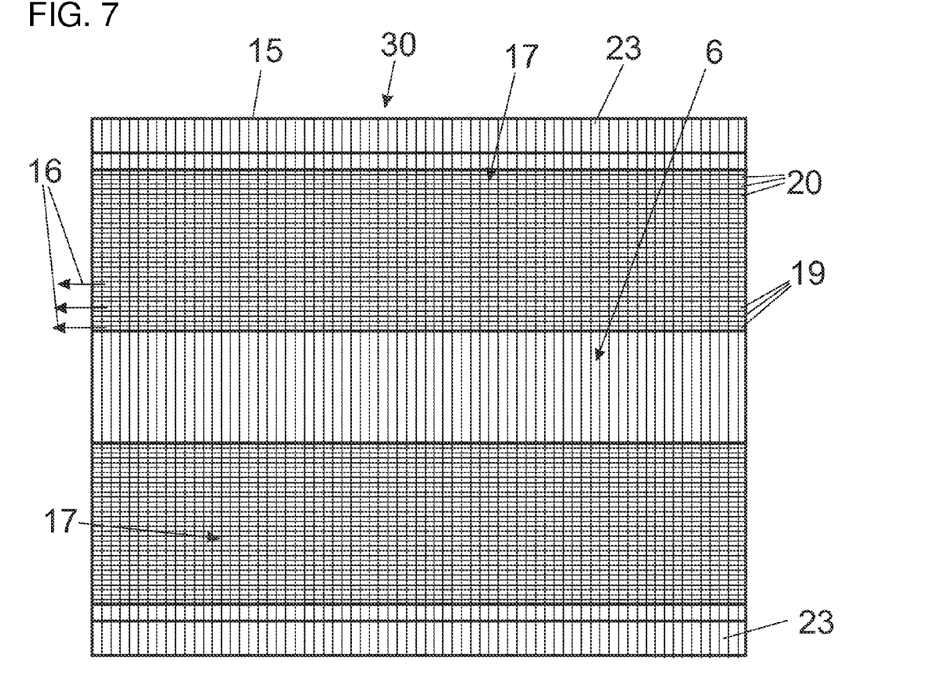
FIG. 7 is an enlarged side view of a bundle of partitions of the second embodiment.

A bundle 17 may, however, not only be composed of partitions 15 extending in the longitudinal direction of the flow zone 5. FIGS. 6 and 7 show a second possibility for configuring a bundle 17 of partitions 15 with flow routes 16. Each partition 15 in this case extends in a radial plane perpendicularly through the outlet duct, and the flow routes 16 are composed of slots 19 which are introduced into the partitions 15. A partition 15 of this type may, in particular, be stamped out of a transformer sheet or the like, a multiplicity of slots 19 being separated from one another by webs 20 which project from a middle connecting web 22 (FIG. 6). The slots 19 thereby extend as far as the edge and are covered by side parts of an insert 24. Connecting webs 22 could, of course, also be provided at both edges, and the slots 19 could extend between these without a middle interruption. As shown in FIG. 7, a plurality of partitions 15 are arranged directly one behind the other, the slots 19 being in alignment. The slot walls in this case constitute the additional pole faces 13, 14.

It is also conceivable to design the partition bundle as a folded element.

Figure 9:
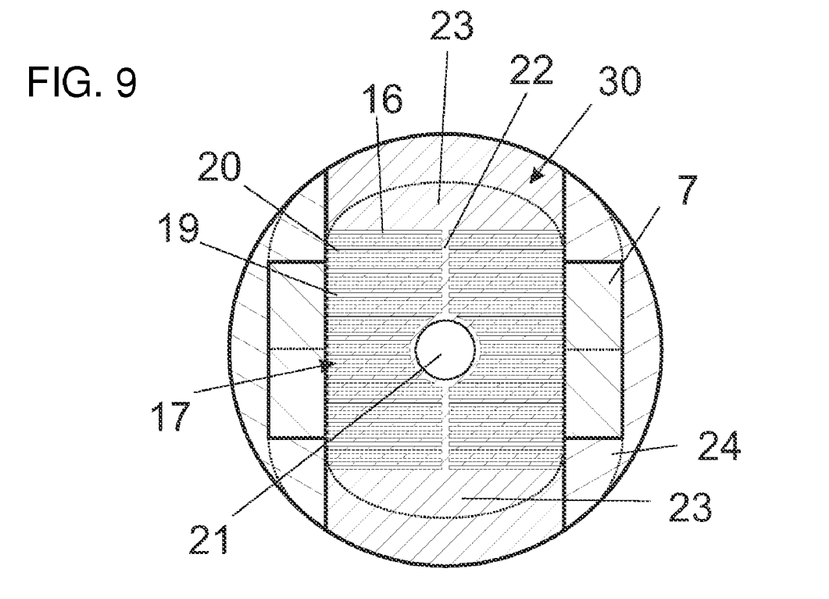
FIG. 9 is a cross-sectional view through a further version of the apparatus with a magnet coil according to FIG. 8.

Manufacture by stamping out from transformer sheet or the like makes it possible, further, to produce the coil core 6, the two bundles 17 of partitions 15 and the closing-off element 23 in the form of a segment of a circle for adaptation to the cylindrical cross section of the outlet duct 5 in one piece which then has the form shown in FIG. 9. Those side faces of the partitions 15 which lie one against the other may be provided with an electrically insulating lacquer, so that eddy currents occurring in the individual partitions 15 are not added together. The part 30 shown in FIG. 9 is equipped with the coil 7 and is introduced into the insert 24 which is then introduced into the outlet duct and fixed axially, for example with the aid of the collecting pot which can be screwed on at the outlet-side end. The insert 24 is formed of a material having low magnetic conductivity, for example of a plastic.

Figure 10:
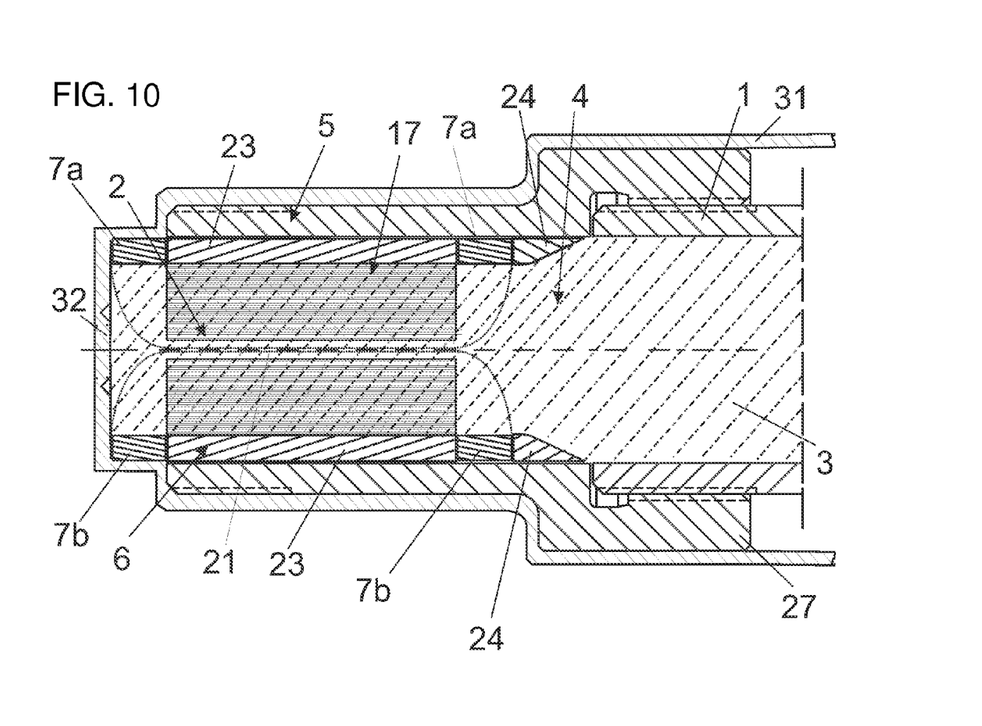
FIG. 10 is a longitudinal sectional view through a third embodiment of the apparatus.

FIGS. 8 to 10 show two versions in which the coil 7 is wound three-dimensionally, that is to say each winding does not lie in one plane, but is composed of a plurality of portions, in each case an approximately semicircular portion 33 being led upward or downward between the straight portions 32 extending in the outlet duct in the longitudinal direction of the flow zone 5. The coil 7 is thereby open at the ends, and a part 30 according to FIG. 9 may have a middle cavity 21 through which, for example, the abovementioned pull means can be led to the piston or the bottom of the receptacle 1. However, the cavity 21 may also serve for receiving a connecting element for the bundle 17 of partitions 15. Since the coil 7 is spread apart at the ends, the core 6 may also have within the coil 7 flow routes 16 which are formed between aligned webs 20 by slots 19.

The form shown in FIG. 8 may also arise from two coils 7a, 7b, as shown in FIG. 10. In this version, each of the two coils 7a, 7b is assigned as a core the element 23 in the form of a segment of a circle, there being arranged between the two elements 23 a bundle 17 of partitions 15 which has flow routes 16 and a central cavity 21. The insert 24 is annular and is beveled toward the receptacle 1, at the same time forming the contraction 4. In this version, too, at least that portion of the outlet duct which contains the flow zone 5 is formed by a cylindrical tubular piece with a threaded sleeve 27 into which the receptacle 1 is screwed. In this version, the receptacle 1 and the outlet duct are arranged jointly within the capsule 31, its bursting region 32 which is formed by the material weakening being provided at the outlet-side end of the flow zone 5.

The flow zone 5 is therefore constantly filled with a magnetorheological fluid 3. The bursting region 32 is designed such that the capsule 31 bursts when a force overshooting a predefined value acts on the energy-absorbing apparatus.

Figure 11:
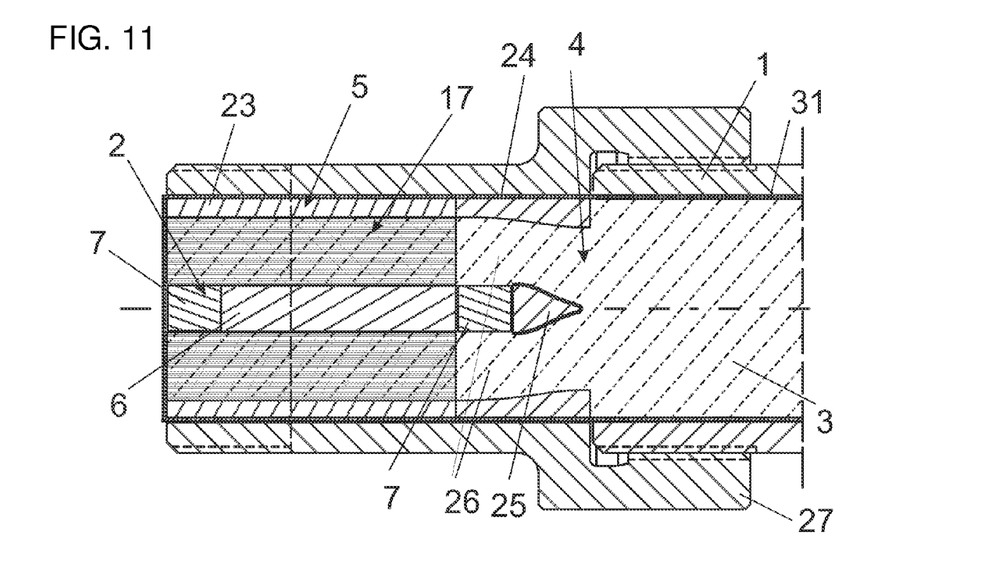
FIG. 11 is a longitudinal sectional view, similar to FIG. 4, through the fourth embodiment.

A similar version is shown in FIG. 11. Here, once again, a similar central coil arrangement to that in FIGS. 6 to 8 is provided, but in the version according to FIG. 11, too, the flow zone 5 is provided in a capsule 31. The capsule 31 lines the outlet duct and the receptacle 1 and has a bursting region 32 at the outlet-side end of the flow zone 5, so that in this version, too, the flow zone 5 is filled constantly with the magnetorheological fluid 3.

The device for generating the variable magnetic field, arranged in the magnetorheological fluid 3 or in the flow zone 5, may also contain a circuit board with a planar coil and with a core, in which case further electronic components for controlling the device 2 may also be arranged on the circuit board.

The coils 7 may not only be manufactured from an insulated copper wire, but also from a copper band, a copper foil or an anodized aluminum foil.

Figure 12:
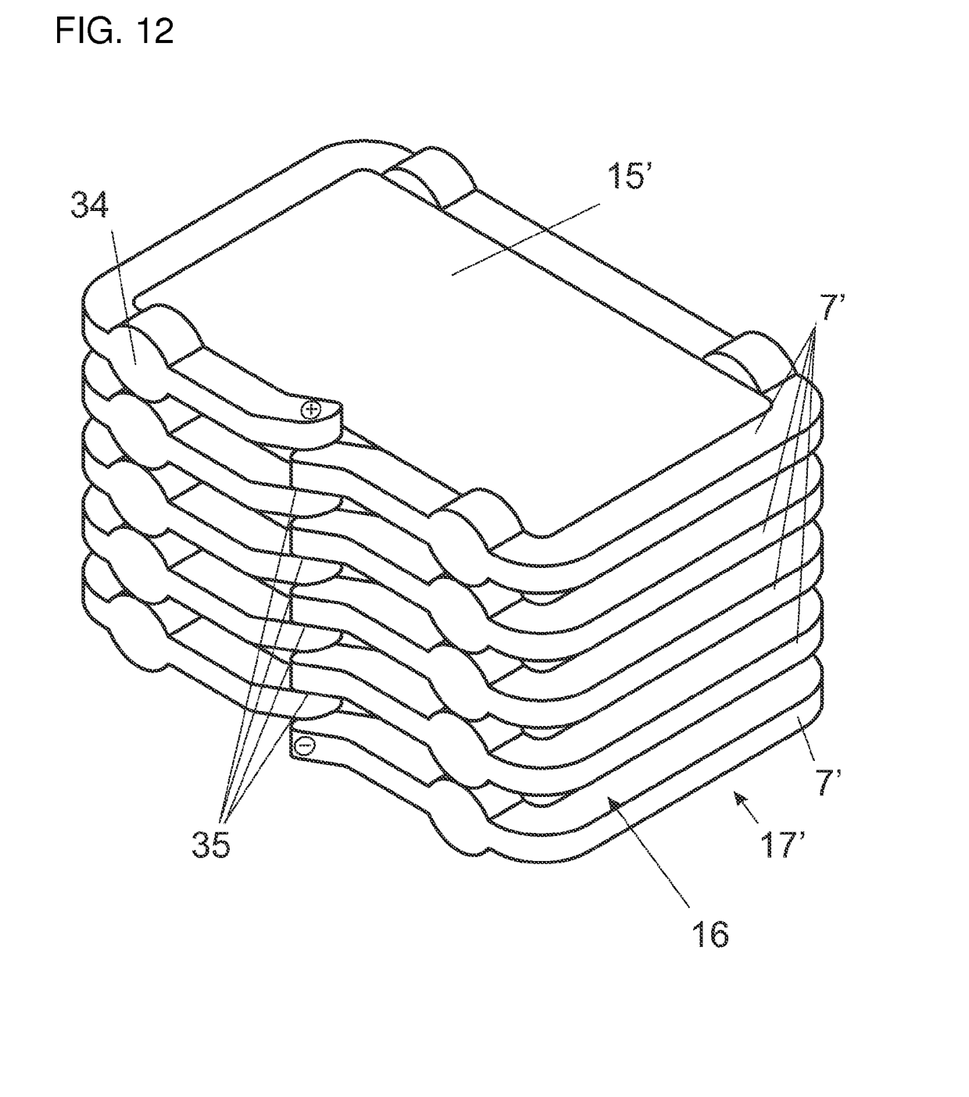
FIG. 12 is a perspective view of a partition stack with individual partition coils.

FIG. 12 shows an exemplary embodiment of a partition stack in which the flow zone is subdivided into a plurality of flow routes 16 by partitions 15' arranged so as to be spaced apart from one another. One of these flow routes is depicted by way of example in FIG. 12 together with an indication of the flow direction.

In this exemplary embodiment, each partition 15' formed of a magnetically conductive or ferromagnetic material is assigned a specific partition coil 7' which in each case has only a single turn. This turn may be formed, for example, by an insulated conductor.

The individual partition coils are connected in series electrically, the output of the partition coil 7' in each case lying above being connected to the input of the partition coil 7' lying beneath. The contact points are designated by 35.

These partition coils 7' may be present alternatively or additionally to the coil 7 of the preceding figures. If they are present only alternatively to this coil, these partition coils linked together form this coil 7.

Preferably, the turn, at least on the inflow and the outflow side, is at most as high as the partition itself, with the result that the through flow is not impeded. The coil may be higher on the side faces. Here, spacers 34 (for example, formed in the insulation of the partition coil 7') and contacts 35 may also be arranged. The turn of the coil may also consist of an anodized aluminum foil. It is also possible to apply this turn to a circuit board. The circuit boards are then stacked as a multilayer.

The partitions 15' preferably are formed of a magnetically conductive ferromagnetic material and form the core of the individual partition coils.

If these individual partition coils are used, the coil in the preceding exemplary embodiments, which bears the reference numeral 7, may be dispensed with, as already mentioned. A benefit in terms of weight and of space is thereby achieved. However, in the case of particularly intense magnetic fields, both coils, to be precise the coil 7 and the partition coils 7', may be used.

The invention claimed is:

1. An energy-absorbing apparatus for occupant protection in vehicles, the energy-absorbing apparatus comprising:
    a flow zone having a sheathing formed of a magnetically conductive material;
    a receptacle containing a magnetorheological fluid being pressed through said flow zone in an event of an impact;
    a device for generating a variable magnetic field having a core being wound around by a coil, the variable magnetic field acting on the magnetorheological fluid for regulating flow properties, said coil together with said core being disposed in said flow zone, said coil having an axis lying perpendicularly to a direction of flow of the magnetorheological fluid;
    said flow zone being subdivided into at least two flow routes by said core surrounded by said coil; and
    partitions having planar polar faces, each of said flow routes being subdivided by at least one of said partitions defining subdivided flow routes.

2. The apparatus according to claim 1, wherein a plurality of said partitions are combined, parallel to one another, in at least one bundle.

3. The apparatus according to claim 2, further comprising spacer pieces, said partitions extend parallel to said flow routes and are spaced apart from one another by said spacer pieces.

4. The apparatus according to claim 3, wherein a height of each of said subdivided flow routes substantially corresponds to a thickness of one of said partitions.

5. The apparatus according to claim 3, wherein said spacer pieces are upstanding tabs.

6. The apparatus according to claim 2, wherein said bundle has a cavity continuous over a length of said bundle.

7. The apparatus according to claim 2, wherein said partitions extend lined up closely to one another perpendicular to the flow direction and have slots formed therein forming said subdivided flow routes.

8. The apparatus according to claim 7,
    further comprising elements in a form of a segment of a circle;
    wherein each of said partitions have webs separating said slots and a connecting web; and
    wherein said webs, a middle region belonging to said core and said elements are formed in one piece and coherently via at least one said connecting web in end regions lying opposite one another.

9. The apparatus according to claim 1, wherein said partitions are combined into two bundles which are disposed on both sides of said core wound around with said coil.

10. The apparatus according to claim 1, wherein said core within said coil contains said subdivided flow routes subdivided by at least one of said partitions, said coil having a winding leaving free an inlet and outlet orifices of said flow routes.

11. The apparatus according to claim 1, wherein said partitions are stamped out of transformer sheet and are insulated on faces touching one another.

12. The apparatus according to claim 11, wherein faces of said partitions are lacquered.

13. The apparatus according to claim 1,
    wherein said core has planar pole faces;
    wherein said sheathing of said flow zone is cylindrical; and
    further comprising elements in a form of a segment of a circle and having additional planar pole faces, said additional planar pole faces disposed opposite said planar pole faces of said core, said elements having curved faces adapted to an inner wall of said sheathing.

14. The apparatus according to claim 1, further comprising a capsule enclosing the magnetorheological fluid, said capsule having a predetermined bursting region which bursts when a defined external force action is overshot.

15. The apparatus according to claim 1, further comprising:
    a plurality of partition coils; and at least part of said partitions each being assigned one of said partition coils which is led around said partition in a region of end faces of said partition.

16. The apparatus according to claim 15, wherein said partition coils each have a single turn.

17. The apparatus according to claim 16, wherein each of said partition coils are formed by an insulated conductor.

18. The apparatus according to claim 15, wherein said partition coils of adjacent partitions are electrically connected.

19. The apparatus according to claim 15, wherein said partition coils of adjacent partitions are electrically connected in series.

20. The apparatus according to claim 1, wherein in a case of a maximum applied magnetic field, the apparatus blocks a passage of the magnetorheological fluid through said flow routes.

21. The apparatus according to claim 20, wherein pressures in the magnetorheological fluid of up to 60 bar can be blocked by the apparatus.

22. The apparatus according to claim 20, wherein pressures in the magnetorheological fluid of up to 200 bar can be blocked by the apparatus.

23. A steering column, comprising:

an energy-absorbing apparatus for occupant protection in vehicles, said energy-absorbing apparatus containing:

a flow zone having a sheathing formed of a magnetically conductive material;

a receptacle containing a magnetorheological fluid being pressed through said flow zone in an event of an impact;

a device for generating a variable magnetic field having a core being wound around by a coil, the variable magnetic field acting on the magnetorheological fluid for regulating flow properties, said coil together with said core being disposed in the flow zone, said coil having an axis lying perpendicularly to a direction of flow of the magnetorheological fluid;

said flow zone being subdivided into at least two flow routes by said core surrounded by said coil; and partitions having planar polar faces, each of said flow routes being subdivided by at least one of said partitions defining subdivided flow routes.

* * * * *